(12) United States Patent
Offer

(10) Patent No.: US 6,255,616 B1
(45) Date of Patent: Jul. 3, 2001

(54) APPARATUS AND METHODS FOR SUBMERGED PROCESSING OF A WORK SURFACE

(75) Inventor: Henry P. Offer, Los Gatos, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/482,874

(22) Filed: Jan. 14, 2000

(51) Int. Cl.[7] .................................................. B23K 9/00
(52) U.S. Cl. ............................................................ 219/72
(58) Field of Search .............................. 219/72, 136, 74, 219/75

(56) References Cited

U.S. PATENT DOCUMENTS 4,172,974 * 10/1979 Stigelin et al. ......................... 219/72
5,750,954    5/1998 White et al. .
5,852,271   12/1998 Offer .

FOREIGN PATENT DOCUMENTS 56-141965 * 11/1981 (JP) ........................................ 219/72

* cited by examiner

Primary Examiner—Clifford C. Shaw
(74) Attorney, Agent, or Firm—Nixon & Vanderhye

(57) ABSTRACT

A housing for a processing device includes a plurality of independently extendible and retractable fingers for engaging the work surface. Gas pressure supplied within the housing drives the fingers into their extended positions and assists in excluding surrounding water from the work surface within the housing. The fingers may have fixed balls, roller balls or slidable wheels at their distal ends to facilitate movement of the housing along the work surface. Flexible skirts may be provided about the fingers to assist in water exclusion from the work area.

31 Claims, 10 Drawing Sheets

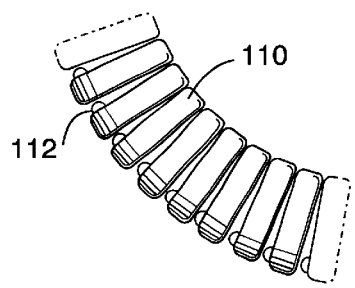
Fig. 8
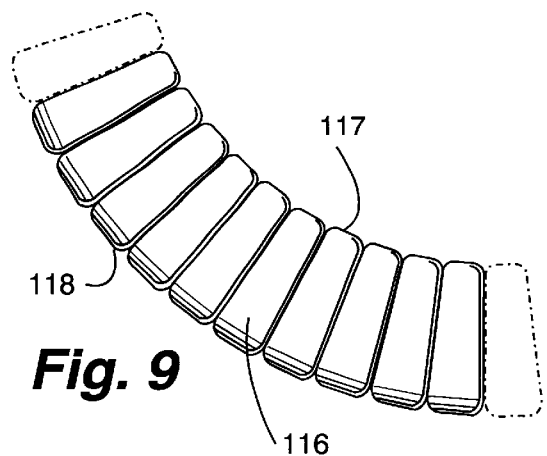
Fig. 9
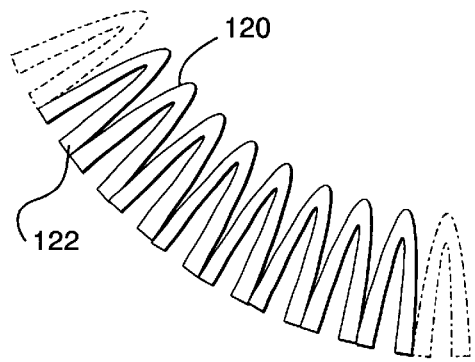
Fig. 10
Fig. 11
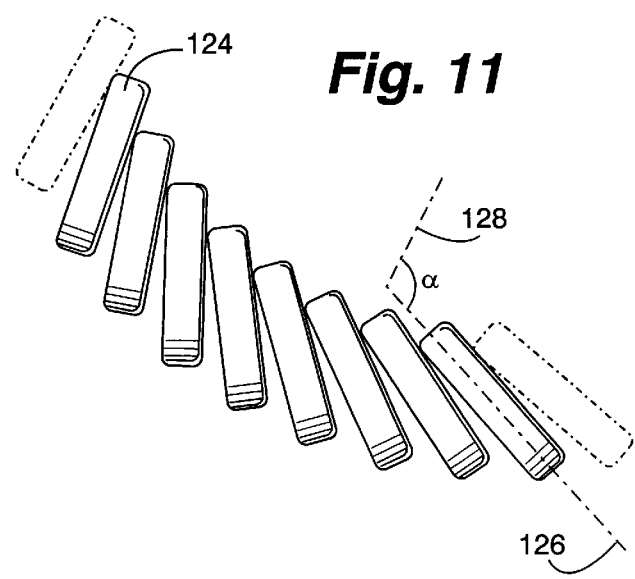

APPARATUS AND METHODS FOR SUBMERGED PROCESSING OF A WORK SURFACE

BACKGROUND OF THE INVENTION

The present invention generally relates to apparatus and methods for submerged processing of a work surface and particularly relates to apparatus and methods for excluding a liquid from a work surface thereby affording a local dry area around a processing apparatus such as a welding torch, heating device or stress-relieving device.

Submerged or underwater processing applications such as welding, thermal stressing and the like require a local dry area around the processing head in order that water can be excluded from the work surface to be processed. For example, in submerged welding, the water must be excluded from the molten metal and nearby heated zone to prevent excessive oxidation, premature cooling and other defects. Inert gas is typically used to displace the water locally around the welding head and to provide a chemically inert atmosphere for the molten metal pool. The work surface in many underwater applications, however, is not smooth or regular, particularly after new or unground weld passes have been applied to a work surface. In these cases, a water exclusion device must have sufficient displacement range to fully comply with the relatively high or low and often abrupt changes in the work surface contour.

For welding applications, water displacement around the weld torch and steam displacement from the heated or cold process area is best achieved at lower gas flow rates to avoid known problems at higher flow rates which may be costly to provide, obscure visibility due to excessive bubble formation or disturb the liquid metal pool or other controlled conditions within the local dry zone. However, for greater surface contour changes, a higher gas flow rate must be used to maintain sufficient water exclusion if the limited compliance seal has insufficient range and lifts off of the work surface for a portion of its perimeter, or if an annular gas flow only design without a compliant seal is used to displace the water from within the torch inert gas cup. In both cases, the higher flow rate is needed to maintain the minimum required gas velocity across the increased gap, which maintains the minimum pressure differential across the gap to keep the flow direction outward with gas flowing into the water, rather than inward with water or mixed phases counterflowing into the welding processing zone. A design combining the benefits of a compliant seal and a gas flow gap may desirably have an increased compliant range relative to either design type alone, however, the combined design will still retain similar problems as each of these design types has individually.

Existing designs for water or other liquid exclusion devices for underwater applications have three basic principles of operation: (1) mechanically sealing the gap between the work surface and the applicator head, e.g., in a welding environment, a cup-shaped gas-filled component around the torch end; (2) flowing gas across the relatively small controlled width gap between the work surface and the applicator head; or (3) providing diverging water/gas cone flowing across a controlled gap to displace water within the contact area of the cone against the work surface. Design variations combining these principles include a gas-permeable compliant seal for multiple concentric flowing water or gas cones. The designs relying on a compliant seal have an inherently limited practical working range because an elastic element is deformed to provide compliance and this element has a limited strain range (before it deforms plastically or is fully compressed), as well as a significantly increasing force requirement for increasing displacement which must be overcome by applicator head manipulation to maintain the desired position along the contoured surface. The force requirement and high displacements may be reduced somewhat by employing thinner or softer deflecting seal elements. However, these thinner elements are increasingly prone to mechanical damage due to inadvertent overloading during use or by tearing during handling operations or while sliding over work surface asperities and discontinuities.

Designs relying on positive water or gas flow through a gap have the limitation that local contour changes or tilting of the applicator head typically generate a differential gap, resulting in the expected differential gas flow around the perimeter of the gap. When the gap is greater in one area, the flow rate and flow velocity of gases, particularly in the case of welding, also becomes greater at the expense of the flow rate and velocity in the remaining areas of the perimeter having a lesser gap. As the flow is reduced in the areas having a lesser gap, the flow rate falls below the minimum required to hold back the water without surging of the water/gas interface or, catastrophically, reverse flow of the water toward the dry welding or process zone within the applicator head housing occurs. Accordingly, there is a need to provide a water exclusion device for submerged processing with a substantially increased compliance range without significantly increased seal application force requirements or increased inert purge gas flow rate requirements.

BRIEF SUMMARY OF THE INVENTION

In accordance with a preferred embodiment of the present invention, there is provided a liquid exclusion apparatus surrounding an applicator head such as a welding torch or material processing device which has significant capability to reliably follow extreme work surface contour changes without allowing liquid such as water to enter the dry area around the applicator head or work surface being processed. A tightly spaced pattern of slidable fingers or plungers are carried by a housing surrounding the applicator head and follow the surface contours by bridging the variable gap between the housing and the contoured work surface. The fingers are continuously pressed against the work surface by gas pressure within the moving device and/or by mechanical means such as springs or may lie in very close proximity to the work surface without flow of gas maintaining the seal between the fingertips and the work surface. The apparatus does not rely on precisely maintaining a controlled or fixed gap between the work surface and a moving rigid applicator head with sufficient gas flowing across the controlled gap to displace water as in the prior art. It also does not require the use of a limited compliance deformable seal to bridge the gap between the work surface and the applicator as in the prior art. As a result, the apparatus has significantly improved mechanical durability and increased work contour variation operating range for underwater applications such as welding, water-jet peening or thermal-based surface residual stress improvement.

The apparatus solves the inherent problems of limited compliance range availability and high purge gas flow rate requirements for welding, cladding, heat treating or mechanical processing such as shot or water-jet peening in a submerged environment, especially on highly contoured work surfaces, e.g., on weld buildups which are not essentially flush with the work surface. The present invention also increases the durability of the sealing components by using strong sliding seal material contacting the work surface and enables a greater rotational misalignment between the work surface plane and the applicator head axis by incorporating an optional, freely turning spherical bearing to support the sliding element assembly. Moreover, the present invention enables movement of the applicator head with a predetermined force applied to the work surface regardless of the surface contour variations, while maintaining improved water sealing between the work surface and the applicator head. The constant force is generated by the constant gas pressure within the apparatus housing that acts on the cross-sectional area of the fingers. The gas pressure within the housing flows continuously out against the ambient water pressure which is at a relatively constant pressure for a given water depth.

An alternative to maintaining a controlled minimum distance between the work surface and the sealing fingers is to have each finger operated independently with a small pneumatic or electromagnetic pin driver connected to a servo-controller which extends each finger as required to make contact with the work surface and then to retract the finger a predetermined distance to provide a minimum clearance. With a limited finger clearance, the purged gas will flow outward and the sliding friction of the fingers against the work surface is minimized, while maintaining the processing zone dry.

In a preferred embodiment according to the present invention, there is provided apparatus for processing a submerged work surface, comprising a closed housing having an opening and movable relative to the work surface, an array of discrete fingers carried by the housing for movement substantially independently of one another between retracted positions and positions extending from the housing surrounding the opening, the fingers having tips for engaging or lying in close proximity to the submerged surface in the extended positions of the fingers, means for extending the fingers substantially independently of one another enabling the tips of the fingers to follow the work surface as the housing is displaced relative to the surface and a working head carried by the housing and interiorly of the fingers for processing the surface through the opening.

In a further preferred embodiment according to the present invention, there is provided an apparatus for processing a submerged work surface having a closed housing, an opening, a working head within the housing and an array of discrete fingers carried for movement substantially independently of one another between retracted positions and positions extending from the housing surrounding the opening, a method for excluding fluid from the work surface, comprising the steps of extending the fingers substantially independently of one another relative to the housing enabling tips of the fingers to engage or lie in close proximity to the submerged surface in the extended positions of the fingers, advancing the housing along the work surface with the fingers following the contour of the work surface and movable independently of one another to substantially exclude fluid from the work surface exposed to the working head within the housing and operating the working head to process the work surface through the opening as the housing is advanced along the work surface.

BRIEF DESCRIPTION OF THE DRAWINGS

FIGS. 8–11 are fragmentary end elevational views of various forms of fingers;

DETAILED DESCRIPTION OF THE INVENTION

Figure 1:
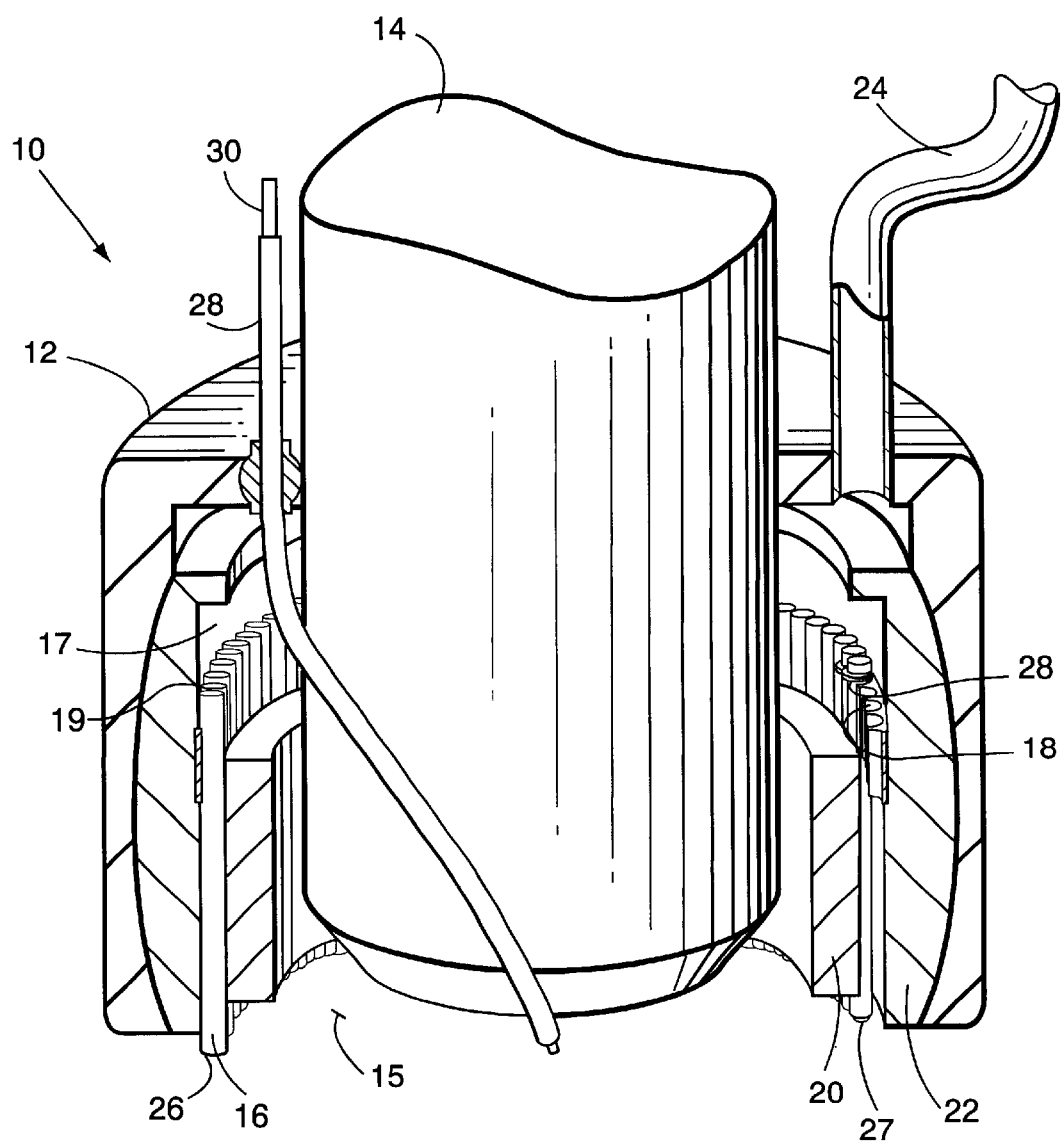
FIG. 1 is a fragmentary perspective view with parts in cross-section of an exclusion device for submerged processing applications constructed in accordance with the present invention.

Referring now to the drawings, particularly to FIG. 1, there is illustrated an exclusion device for underwater or submerged processing applications, generally designated 10. It will be appreciated that the underwater apparatus may be employed for a variety of applications, for example, welding, water-jet cleaning, thermal-based surface residual stress improvement and other types of applications. The present description, however, refers to a particular application of the present invention to underwater welding and it will be appreciated that the invention is not, therefore, limited to underwater welding but embraces other applications.

The apparatus 10 includes a housing 12 which is closed at its top and sides and has an opening 15 at a lower end thereof. The housing 12 also includes an applicator head 14, for example, a welding torch. The applicator head 14 extends through the housing 12 such that the tip of the head 14 is in position to process the work surface through the open lower end of the housing 12, i.e., to weld on the work surface. The housing 12 includes an array of discrete or individually slidable fingers or plungers 16 which are mounted in closely-spaced holes or seats 18 located in an area, e.g., an annulus, between an inner race 20 and a spherical bearing surface 22. The fingers 16 are movable between extended positions and retracted positions relative to the housing 12 independently of one another. Consequently, each finger 16 is movable independently of an adjacent finger and the extent of travel of each finger is therefore independent of the extent of travel of adjacent fingers. In the illustrated form in FIG. 1, the fingers have a circular cross-section, although it will be appreciated that non-circular cross-sections may be used. Thus, the fingers act similar to plungers in that they can all move in or out of the housing 12 according to the positions they are extended to, i.e., inward by a high spot on the work surface against the pressure in the housing or outward at a work surface low spot. Means are provided for controlling the movement of the fingers. For example, the movement of the fingers 16 can be controlled by any number of a variety of mechanisms, such as gas pressure, springs, magnets and the like. Gas pressure within the housing, however, comprises a preferred mechanism for advancing the fingers from their retracted to their extended positions.

To extend the fingers from retracted positions, a gas inlet supply line 24 is provided for supplying gas into the interior of the housing 16, i.e., into chamber 17. It will be appreciated that the interior ends or heads 19 of the fingers 16 are exposed to the gas pressure within housing 12. Consequently, with the gas pressure within the housing applicable against the interior end faces of the fingers, the fingers may be extended from their retracted positions to extended positions limited only by the contact between the fingertips 26 and the work surface. The fingers 16 are retained within the raceways provided by the seat 18 and the inner race 20 by a retaining ring which engages a shoulder, head or flange on each finger at its extended travel limit position. For example, a projection 28 (FIG. 1) may be provided along the inner surface of each finger adjacent the inner end surface forming a stop limiting travel of the finger from the housing, the stop bearing against the inner face of the inner race 20. It will be appreciated that any other suitable retaining device can be employed to retain the fingers in the housing in their extended travel limit position.

Because the gas pressure within the housing acts uniformly on the interior end faces of the fingers, the finger contact force on the work surface will be uniform and primarily a function of the gas pressure. Thus, it will be appreciated that the force of the fingertips on the work surface can be adjusted by adjusting the gas pressure. The welding torch 14 is accompanied in this preferred embodiment of the invention illustrated in FIG. 1 by a tube 28 which houses the wire feed or welding rod 30.

It will be appreciated that the cross-sectional shape of the fingers 16, while preferably round, may have other shapes as desired, for example, rectangular or multi-sided. For non-circular transverse cross-sectional shapes, such as rectangular shapes, the tip of each finger 16 may have a large radius on two opposing sides facing the adjacent fingers to enable the fingers to readily slide over irregular contours in the work surface and only a small radius on the other opposing edges to improve gas sealing capability. The spacing of the fingers is preferably close to and preferably in contact with one another in order to minimize the gap and corresponding gas flow rate through which the gas purge flows to prevent water intrusion.

Preferably, the material of the fingers and their inner and outer raceways 20 and 18, respectively, are compatible with the work material which are corrosion-resistant when wetted and which have a low friction coefficient with each other. For example, hardened stainless steel bearing fingers may be employed. Insulating surfaces may be applied on the fingers when an electrically sensed (ground potential sensing) AVC-type of pin clearance servo is utilized.

Figure 2:
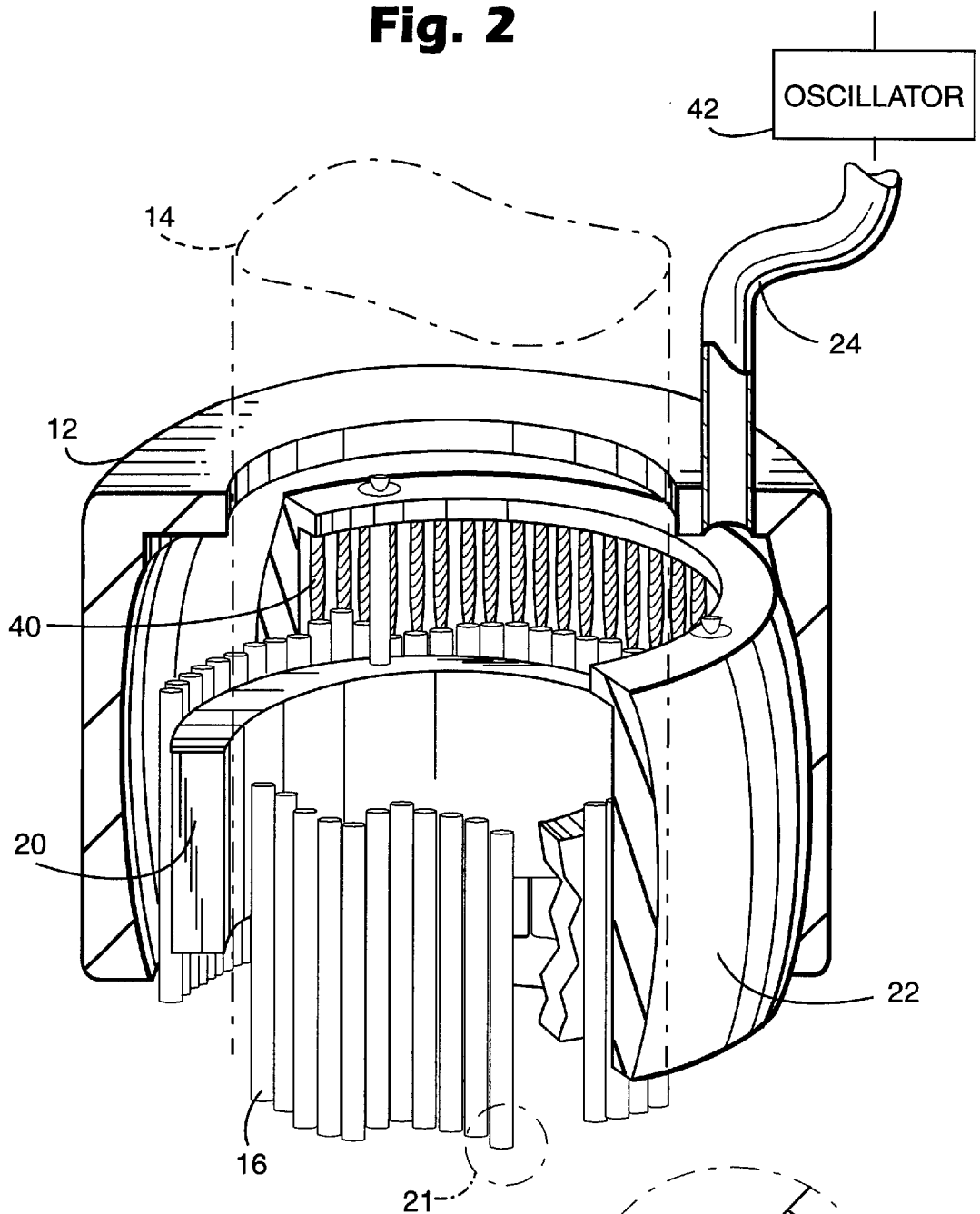
FIG. 2 is a view similar to FIG. 1 illustrating a further embodiment thereof.
Figure 21:
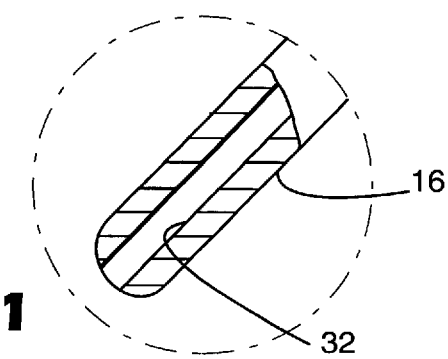
FIG. 21 is an enlarged fragmentary cross-sectional view illustrating the tip of a finger illustrated in the dashed line circle of FIG. 2.

As illustrated in the enlarged illustration of the end of the fingers in FIG. 2, the fingers may be hollow to permit gas flow through the fingers and their tips. Consequently, the fingers 16 may have an axial extending passage 32 from within the housing in communication with the gas pressure through the fingertip. The gas thus facilitates drying of the water/gas interface region of the work surface. Also supplying gas through the fingers and through the tips facilitates control of the axial force of the fingers. Moreover, the ends of the fingers located against the work surface are smooth and have radiussed edges to allow smooth sliding over weld bead crowns. Additionally, while the illustrated apparatus has a generally cylindrical configuration, the housing 12 may have any shape or size consistent with the application of the device and/or with the contoured work surfaces. The housing 12 also may be integral with the welding torch housing 14 or the torch housing may be removed from the housing 12 as desired.

While the fingers are continuously pressurized to slide out of the housing due to the differential between the gas pressure acting on the finger ends within the housing and the lower water pressure acting on the tips of the fingers, the gas flowing through the passages 32 of the fingers 16 allows the fingers to essentially "float" across the surface during travel of the housing with significantly reduced friction. Because the gas flows at a higher pressure than that of the water, the reaction force of the gas against the work surface will tend to make the tubular fingertip lift off the work surface until the gas can escape into the water without the additional flow restriction of the otherwise contacting solid surface. Consequently, a finger position "equilibrium" is obtained at this offset location with the standoff distance from the work partly controlled by the applied gas pressure. The closer the fingertip gets to the work surface, the greater the reduction in leakage and corresponding increase in pressure, with the result that the escaping gas displaces the finger back from the work surface, allowing it to float slightly. The finger hole size may be predetermined to provide the desired back pressure by increasing the hole size to decrease the outward force or decreasing the hole size to increase the force. Consequently, in this form of the invention, the fingertips lie in close proximity to the work surface.

From the foregoing, it will be appreciated that various processing applications are enabled by use of the exclusion apparatus of the present invention. For example, the exclusion apparatus enables a local dry moving zone to be maintained on uneven work surfaces for purposes of thermal spraying, welding, welding with the addition of filler material in its various forms, i.e., wire, powder, ribbon and the like, mechanical or water-jet peening or for changing the residual stress state of the surface by heating and subsequent liquid quenching of the surface in a progressive pattern. It will also be appreciated that the applicator head may be moved along contoured surfaces which are non-uniform and/or irregular. For example, water may be excluded from inside or outside corners employing the applicator head hereof, as will be appreciated from the ensuing description.

Referring back to FIG. 1, the spherical bearing joint 22 between the raceway 18 mounting the fingers 16 and the housing 12 affords a self-aligning feature for the sealing tips of the fingers relative to the applicator head, i.e., the welding head 14, and its supporting mechanism. The effective travel range capability of the housing is thus effectively increased without increasing the travel range of the fingers within their raceways. Instead of a spherical bearing joint, a bellows may interconnect the housing and the raceways for the fingers to provide this self-aligning feature.

Referring now to FIG. 2, springs acting on the fingers 16 may be employed in lieu of or in combination with the gas pressure to extend the fingers into contact or close proximity with the work surface. Thus, the springs 40 in FIG. 2 comprise individual helical coil springs 40 acting between the spherical bearing 22 and the interior end faces of the fingers 16. The springs thus may be coil compression-type springs, or elements of a monolithic spring device, with each spring element located at and pushing against the fingers in the housing.

Also as illustrated in FIG. 2, an oscillator 42 may be incorporated in the pressurizing gas stream to cause the device housing and its fingers to vibrate with high-frequency, low-amplitude motion, enabling the fingertips to glide over the work surface with low friction as the head moves along the work surface. The gas supplied the housing is thus in a vibratory mode provided by the oscillator 42. The finger vibration also ensures that the fingers do not stick in the housing raceways due to side loading which occurs during applicator head travel along the work surface. Thus, the vibrating fingers need only overcome the dynamic friction force to enable movement over the work surface rather than overcoming the static friction force which is typically higher and undesirable. It will be appreciated that other mechanisms may be employed to provide the vibratory motion through the fingers. For example, a secondary fluid flow can be used to actuate the vibratory motion of the fingers. Further, a motor and offset rotating weight may be used to generate the vibration. Still further, the vibrating mechanism may alternately be an electrically driven oscillator such as a piezoelectric crystal or an electromagnetic coil, thereby enabling fully independent and variable adjustment of the vibration frequency and/or amplitude. It may be built within the housing 12 or comprise a separate external component attached to the housing or its support.

The optional vibratory motion of the fingers can be adjusted to have the beneficial effect on the surface residual stresses of the workpiece by reducing their normally high tensile value or, depending on the application, reducing them sufficiently to generate a compressive surface residual stress. This benefit may be achieved progressively during welding or other processing since many applications require a multi-pass weld deposit or cleaning treatment. This is similar to the conventional practice for peening surfaces to improve their stresses. However, the vibratory motion of the fingers introduces lower impact forces in order to avoid the detrimental effects of heavy cold-working of the surface which is susceptible to stress corrosion cracking and is performed in the same process step as the welding. Moreover, employing the present mechanical method of stress improvement enables the width of the treated zone to extend well beyond the edge of the weld deposit and makes the needed stress improvement independent of the welding process parameter ranges.

Figure 3:
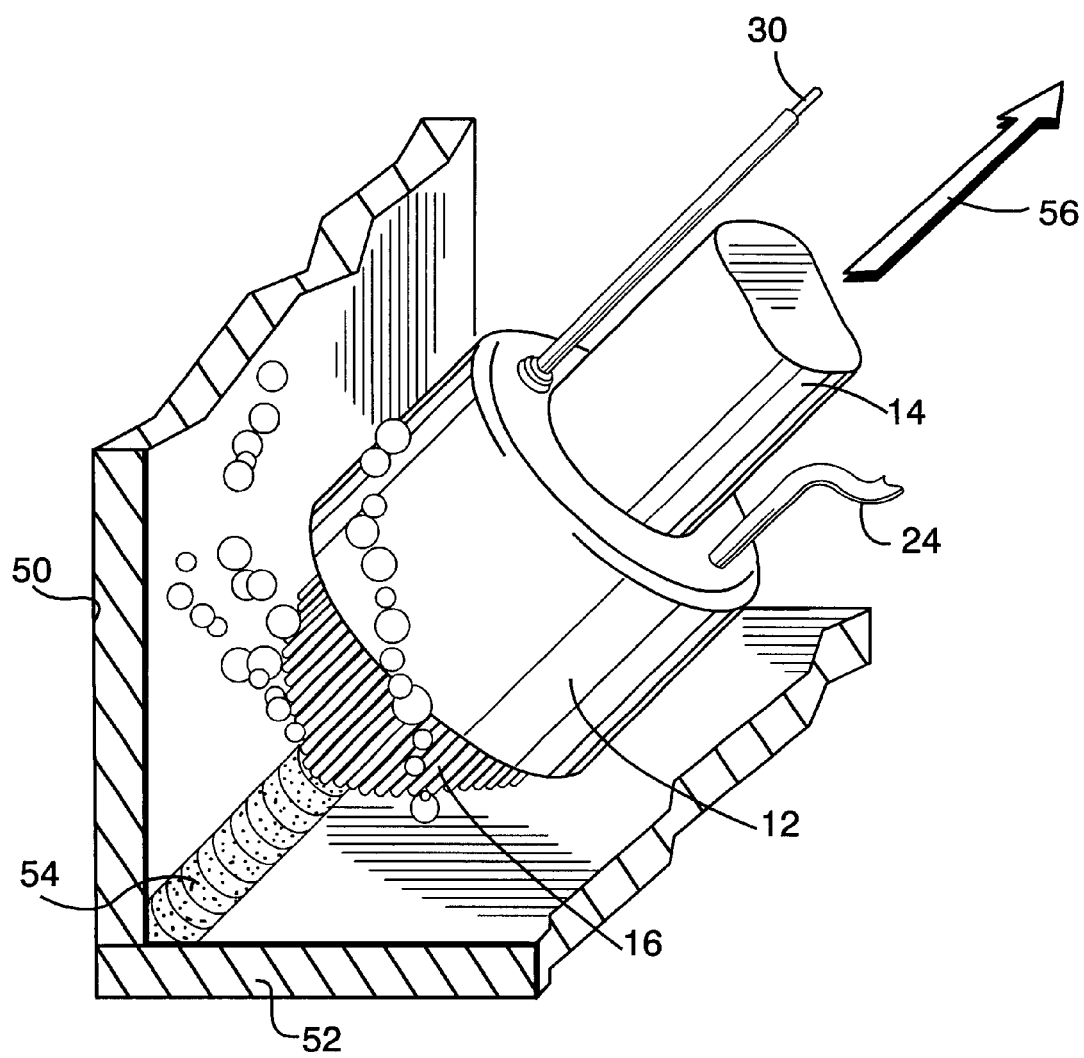
FIG. 3 is a fragmentary perspective view illustrating the application of the apparatus against a contoured work surface, for example, a welding head for welding metal plates at right angles to one another.

An example of the application of the device to exclude water from a weld bead is illustrated in FIG. 3. In FIG. 3, a pair of plates 50 and 52 are at right angles to one another and welded together by the welding torch 14 with the addition of weld material 30 forming the weld bead 54. As illustrated, the housing 12 is applied at the juncture of the plates 50 and 52 and at an angle to both plates. It will be appreciated that the fingers 16 thus variably extend from the housing 12 to contact the contoured surfaces, i.e., the right angularly related surfaces of the plate 50 and 52. With the fingers in contact with one another and with the surface, together with the flow of gas via gas supply line 24 to within the housing and outwardly through any gap between the fingers and the work surfaces, the water is excluded from the area within the fingers. Consequently, welding may proceed as the housing 12 is moved along the joint, for example, in a direction of the arrow 56.

While the preferred embodiment of the housing is circular as illustrated in FIGS. 1–3, the housing may have an eccentric applicator head, e.g., torch location within the body to allow welding or other processing closer to the bulkheads or component edges without interference with the body perimeter. An eccentric applicator head location can also provide desired variations in the delay of water quenching of the heated area for a predetermined housing travel speed. Symmetrical but non-circular shapes can also be of benefit when welding in deeper grooves when the long dimension is oriented parallel to the direction of housing travel. Also, the portion of the housing containing the fingers may have a general shape at its outlet end which conforms to an inside or outside corner or other surface contour variations such as a weld groove. This configuration enables a reduction of the maximum travel range required by the sealing fingers and a reduction of the maximum extension of the fingers beyond the outlet end of the housing. Bending moments and the potential for finger flexing are also reduced with decreased finger extended length.

Figure 4A:
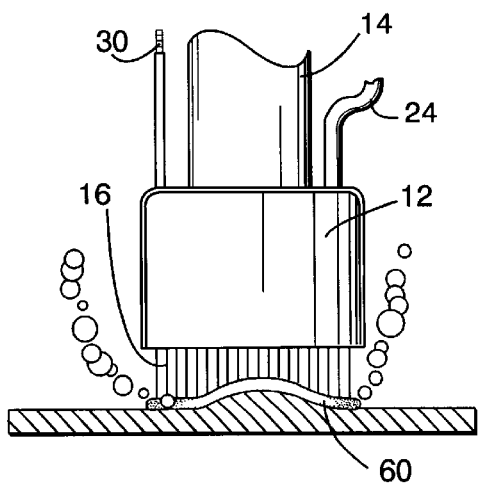
FIGS. 4A, 4B, 4C and 4D are fragmentary elevational views with parts in cross-section illustrating further embodiments of the present invention.

Referring to FIG. 4A, a combination of finger seals and a flexible porous seal mounted on the end of the fingers affords the advantages of each sealing method if used separately. For example, the fingers 16 in FIG. 4A provide greater axial compliance than a solid material substrate. Thus, a porous seal 60 is mounted on the tips of the fingers 16 for movement therewith. Because the fingers provide axial compliance, the porous seal 60 readily follows the surface contour variations as illustrated considerably more readily than in the absence of fingers. The seal 60 may be formed of a porous or non-porous material. For example, a lower heat-resistance non-metallic material such as silicon rubber may be employed as the seal 60 on the external surface of the fingers 16.

Figure 4B:
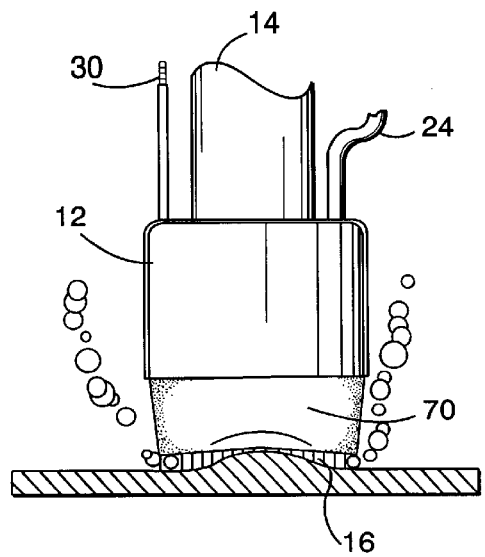

Referring now to FIG. 4B, the seal afforded by the fingers 16 may be combined with an exterior flexible skirt or bellows 70. This non-porous bellows 70 comprises a membrane surrounding the outside of the fingers in their extended positions and is sealed to the housing 12 at its upper end. This generates a tight sealing effect, forcing all of the excess process/purged gas to flow out at the fingertip to work surface interface. The membrane 70 is sufficiently loose about the fingers to allow the fingers to slide in and out of the housing 12 during use with minimal restriction on their motion. The membrane 70 also eliminates the need for a conforming seal located about the portion of the fingers within the housing.

Figure 4C:
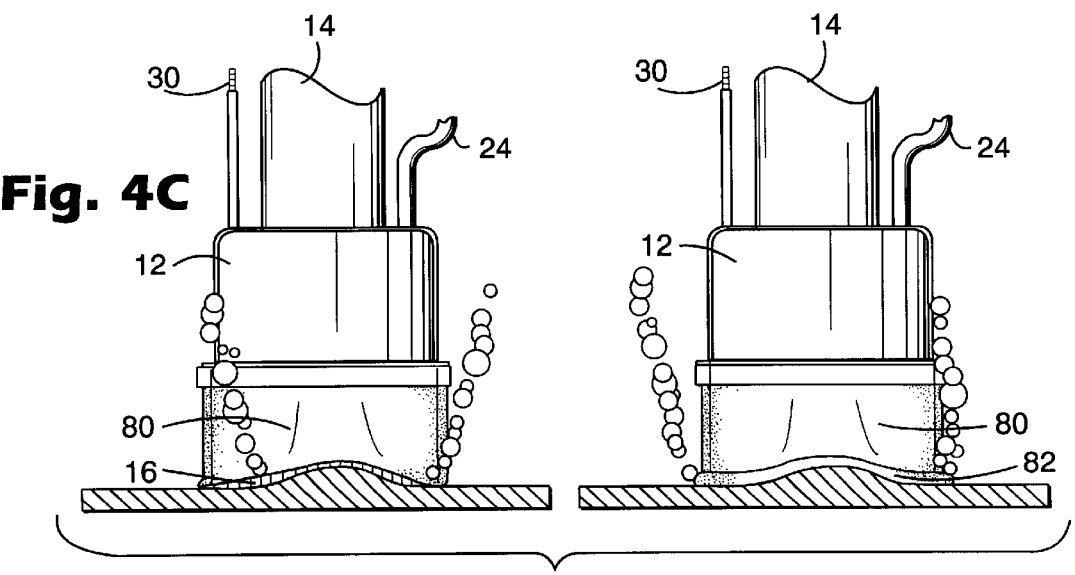

In FIG. 4C, the flexible external skirt or bellows 80 is formed of a heavier material which affords additional sealing effect. In FIG. 4C, the heavier bellows or skirt 80 may also mount a flexible porous seal 82 at the end of this bellows or skirt 80 adjacent the work surface (see the right-hand illustration of FIG. 4C). This combination with the fingers allows a more uniform distribution of the purged gas to escape through the porous seal positioned about the perimeter of the dry area inside the exclusion device. Use of the porous seal also increases the flow resistance of purged gas out of the device, hence improving its capacity to retard water entry.

Figure 4D:
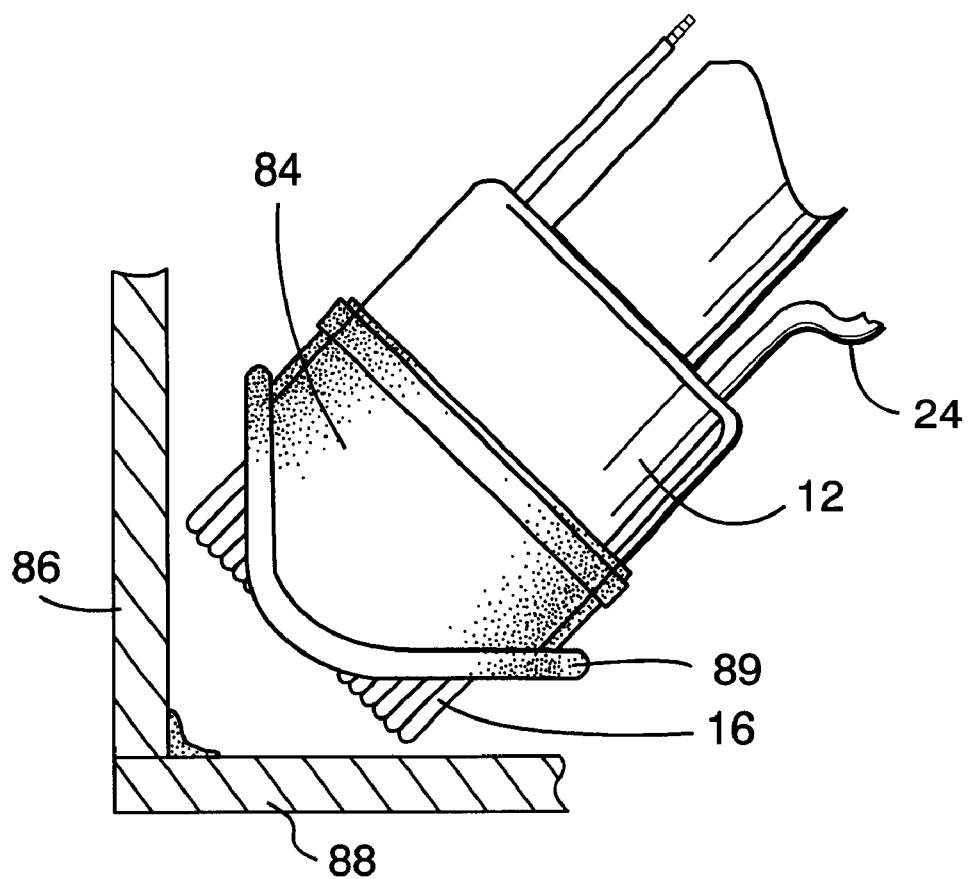

In FIG. 4D, a pre-shaped flexible skirt 84 extends from the housing 12 and surrounds the fingers 16 in their extended positions. The skirt 84 is pre-shaped according to the contours of the work surface, in this instance, two right angularly related plates 86 and 88 being welded to one another. The lower end of skirt 84 may have a rib 89 for bearing against the surfaces 86 and 88, the fingers lying in extended and partially extended positions depending upon the contours of the work surface.

Figure 5:
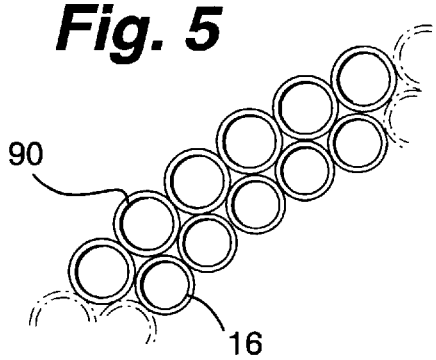
FIG. 5 is a fragmentary plan view of arrays of the fingers with one array outside of another array.

Referring now to FIG. 5, the fingers 16 may be provided in a single continuous array of fingers about the housing 12. In FIG. 5, however, an additional array of fingers 90 are provided about the fingers 16. Multiple arrays of fingers closely spaced to one another provide increased water exclusion and sealing. The increased sealing effect is caused by the increased total gas pressure drop across the labyrinth of fingers as compared to that developed across only one row. To maintain finger alignment and position stability, each row or array of fingers is mounted in its own full complementary raceway, where each finger is mounted in a corresponding opening or hole in the housing.

Figure 6:
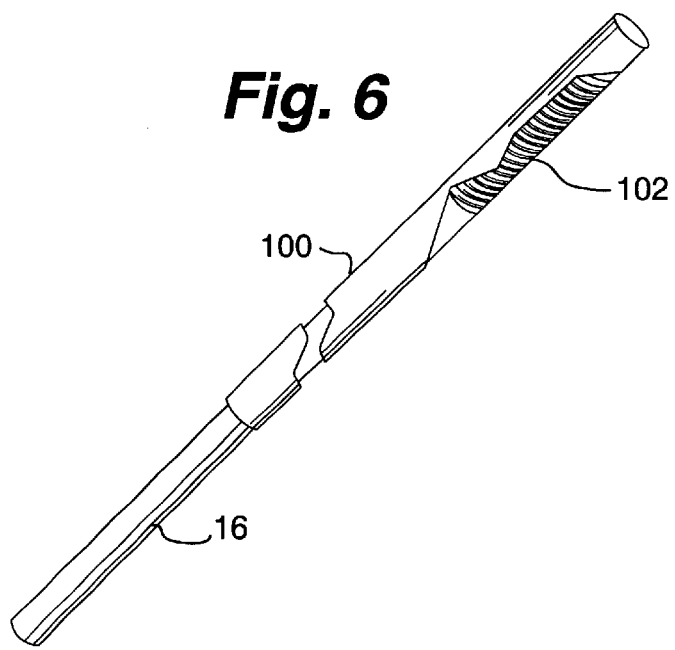
FIG. 6 is a perspective view with parts broken out illustrating a spring-biased telescoping form of the fingers.
Figure 7:
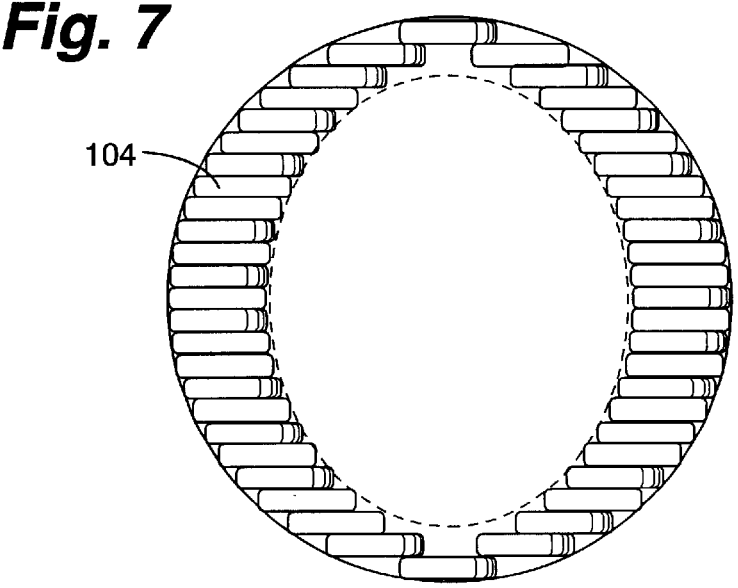
FIG. 7 is a plan view of a plurality of rolling fingers.

The labyrinth effect of the multiple arrays of fingers illustrated in FIG. 5 is of increased benefit when the fingers 16 are individually mounted in tubes 100 as illustrated in FIG. 6. By employing tubes 100, the tubes space adjacent fingers an amount equal to twice the wall thickness of the tubes. By additional arrays of fingers, such as an array 90, the flow resistance through the curtain of fingers surrounding the applicator head is significantly increased. The tubes 100 are thin-walled so that the adjacent surfaces of the fingers are in sufficient close proximity to one another such that the gas flow rate through the gaps can maintain the water boundary outside of the perimeter of the housing. This tubular mounting of the fingers enables a construction of a compact housing and improves alignment and reduces sliding friction of the fingers against their support members. As illustrated in FIG. 6, springs 102 are employed to extend the fingers 16 toward their extended positions. It will be appreciated, however, that the fingers may be biased and extended by gas pressure alone or a combination of gas pressure and springs.

Referring to FIGS. 7–12, a variety of non-circular finger shapes may be employed. For example, in FIG. 7, the fingers 104 may have rectangular cross-sectional configurations with the length dimension of each finger lying parallel to the length dimension of every other finger. This facilitates sliding movement of the housing 12 in the direction of the length dimension of the fingers along the work surface. The tips of fingers 104 may be rounded or have rollers as in FIG. 12, described below.

In FIG. 8, the transverse cross-sectional area of the fingers 110 may comprise rectangles with the length dimension corresponding to the radial direction of the housing. Because of the rectilinear configuration of the fingers, the circumferential registering sides of the fingers diverge from one another in a radial outward direction. Projections 112 may be provided on the adjoining outer side surfaces to maintain the fingers in divergent relationship to one another.

Figure 12:
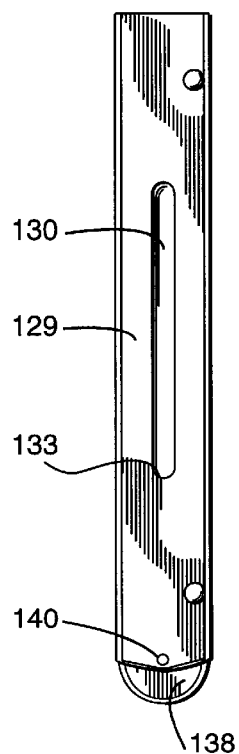
FIG. 12 is a side elevational view of a form of finger hereof.
Figure 13:
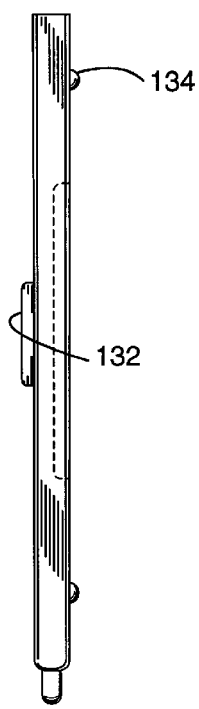
FIG. 13 is an elevational view thereof as viewed from left to right in FIG. 12.
Figure 14:
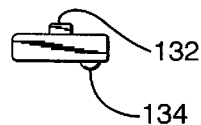
FIG. 14 is a top plan view of the finger of FIG. 12.

In FIG. 9, the fingers 116 may have a transverse cross-sectional shape having non-parallel sides along the radii of the housing. Thus, the radially inner sides 117 and fingers 116 he a width dimension less than the width dimension of fingers 116 along their radially outer sides 118. A circular bellows-type arrangement of fingers 120 is illustrated in FIG. 10. The fingers 120 thus have a transverse cross-sectional shape in the form of a shallow V, with the apex of the V on the radial inner side of the fingers. The outer edges 122 of each V-shaped finger 120 may slidably engage the outer edge of adjacent fingers. In FIG. 11, fingers 124 having a generally rectilinear transverse cross-section are employed in a staggered arrangement. That is, the long axis 126 of the rectangular cross-section of each finger is skewed relative to the radius 128 of the housing with the skew angles a being substantially constant about the entire periphery of the array of fingers. Referring to FIGS. 12–14, the fingers 129 may have a generally rectilinear transverse cross-sectional configuration, with each finger having a groove 130 formed along one side of the finger. A projection 132 is formed along the opposite side of the finger for engaging in the groove 130 of the adjacent finger 129. The grooves and projections serve as limiting detents to the extension and retraction of adjacent fingers relative to one another. That is, the length of travel of one finger is limited by the length of travel of its projection in the groove 130 of the adjacent finger, coupled with the movement of the adjacent finger relative to other fingers. Thus, the opposite ends of groove 130 form stops 133 for the projection 132 of an adjacent finger. Additionally, each finger may have a standoff or projection 134 similarly as illustrated in FIG. 8. It will be appreciated that the tongue-and-groove arrangement limits the stroke between adjacent fingers without limiting the total stroke of the finger assembly.

Additionally, the tips of the fingers may be provided with a rotatable ball, a fixed ball or a wheel to provide rolling capacity along the work surface, e.g., a wheel 138 pivoted to the finger 129 for rotation about an axis 140. These features reduce the applied force required to advance the applicator parallel to the work surface during welding or other processing. If ball rollers are utilized, they are fitted in their sockets with controlled clearance to the tubular fingers and would tend to act gas check valves when in contact with the work surface to automatically provide the "floating" finger function described previously. Alternatively, the ball may be fixed to the ends of the fingers. Preferably, the ball would be formed of a material having a reduced coefficient of sliding friction relative to that of the coefficient of friction of the finger material. For example, a dense polished metal carbide or ceramic ball may be used. A ball 27 is illustrated in FIG. 1 at the tips 26 of the fingers 16.

Figure 15:
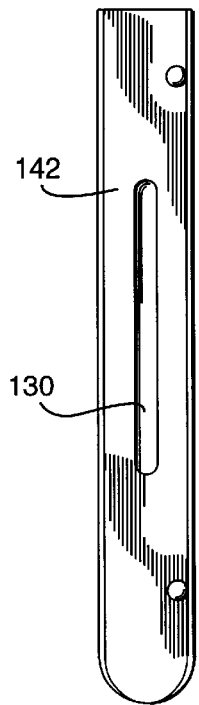
FIG. 15 is a side elevational view of a further form of finger hereof.
Figure 16:
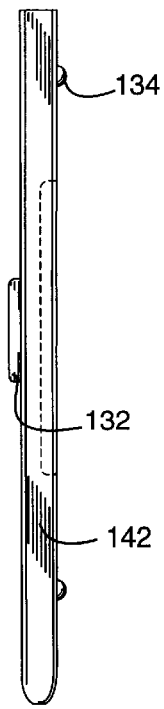
FIG. 16 is an elevational view thereof as viewed from left to right in FIG. 15.
Figure 17:
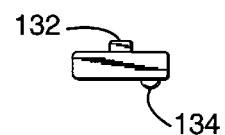
FIG. 17 is a top plan view thereof.
Figure 18:
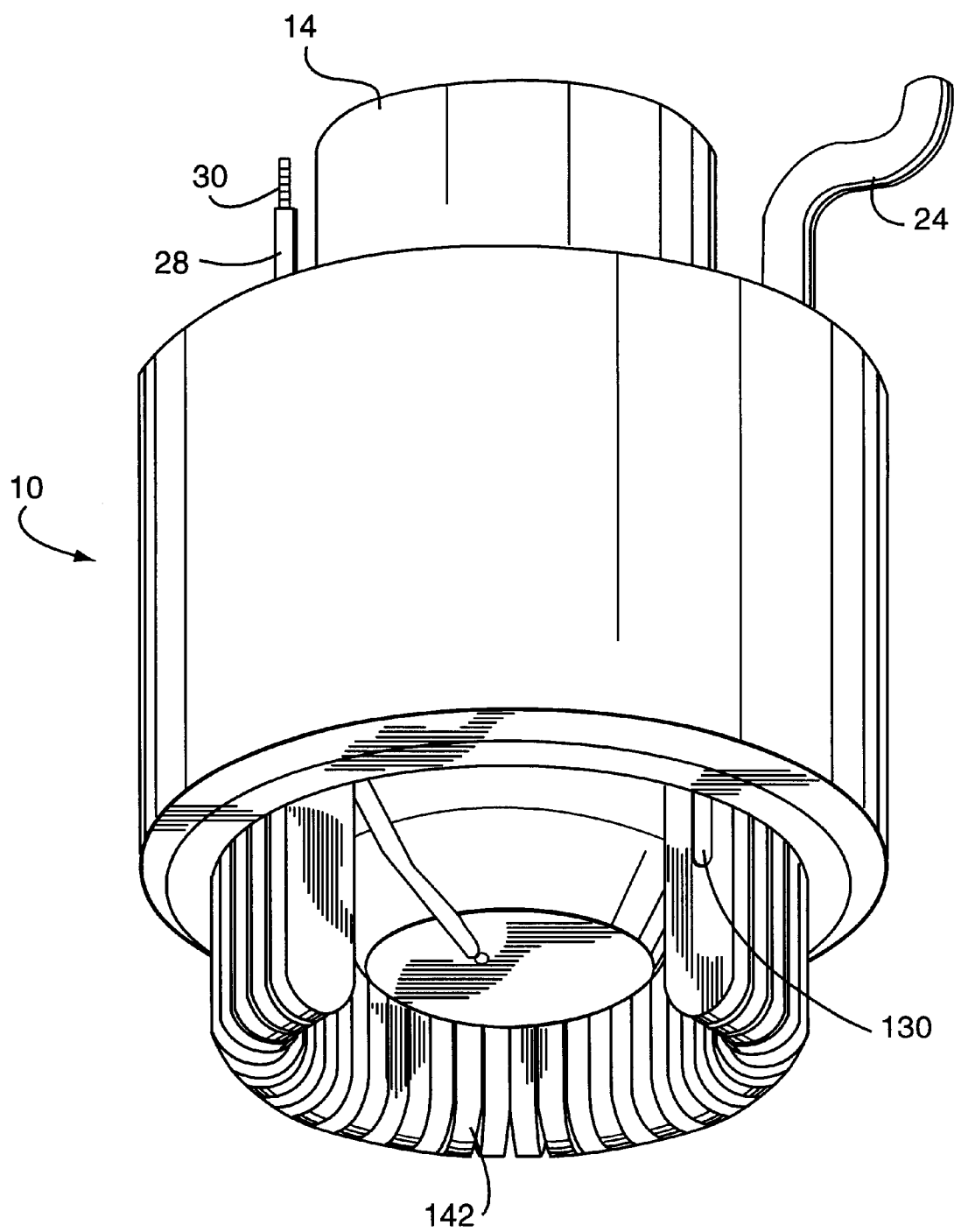
FIG. 18 is a fragmentary perspective view illustrating the applicator head employing the fingers illustrated in FIGS. 12–14.

As illustrated in FIG. 12, wheel 138 is pivoted for rotation about the axis 140 normal to the axis of the fingers. The wheel thus projects from the finger for engagement with the work surface. The wheels, similarly as the balls, reduce the friction between the fingers and work surface thereby reducing the force necessary to advance the applicator along the processing path. In FIGS. 15–17, the fingers 142 are similar to the fingers illustrated in FIGS. 12–14, but without the rotatable wheels on the finger tips. The tips of the fingers 142 are radiussed to engage the work surface. Fingers 142 are illustrated in FIG. 18 in the arrangement of the underwater exclusion device 10.

Figure 19:
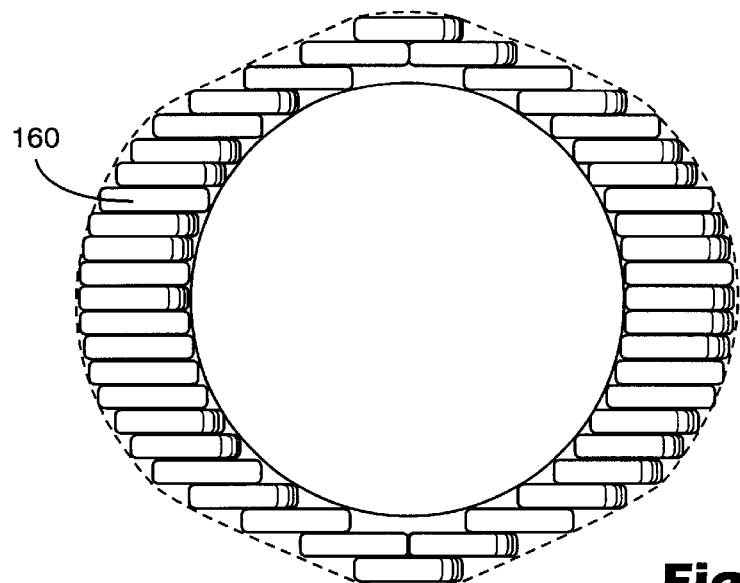
FIG. 19 and 20 illustrate arrangements of fingers in arrays thereof forming an internal circular configuration in concentric internal and external circular configurations, respectively.
Figure 20:
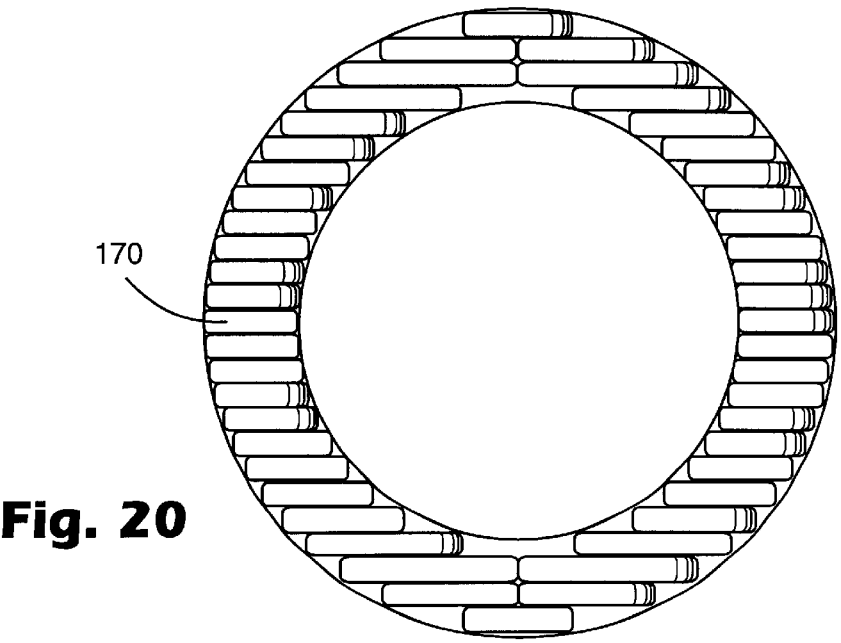

Referring back to FIG. 7, and for specific applications, the fingers may have a non-circular configuration such as the illustrated rectangular configuration. It will be appreciated that in the illustration of FIG. 7, the cross-sectional configuration of the fingers are uniform in size and the circular arrangement of the fingers 104 provides a circular outside diameter to the seal. The fingers 160 may also be uniform in size and arranged to form a circular interior diameter as illustrated in FIG. 19. Also, fingers 170 of varying sizes, e.g., different rectilinear lengths in transverse cross-section and arranged parallel to one another, may be used to provide an array of fingers having concentric inner and outer diameters as illustrated in FIG. 20.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for processing a submerged work surface, comprising:
    a closed housing having an opening and movable relative to the work surface;
    an array of discrete fingers carried by said housing for movement substantially independently of one another between retracted positions and positions extending from said housing surrounding said opening;
    said fingers having tips for engaging or lying in close proximity to the submerged surface in said extended positions of said fingers;
    means for extending said fingers substantially independently of one another enabling the tips of the fingers to follow the work surface as the housing is displaced relative to the surface; and
    a working head carried by said housing and interiorly of said fingers for processing said surface through said opening.

2. Apparatus according to claim 1 wherein said extending means includes a gas chamber within said housing in communication with portions of said fingers for extending the fingers.

3. Apparatus according to claim 1 wherein said extending means includes springs for biasing said fingers for movement into said extended positions thereof.

4. Apparatus according to claim 1 wherein said working head includes a welding torch.

5. Apparatus according to claim 1 wherein said fingers are elongated and have non-circular transverse cross-sectional configurations, said fingers lying in contact with adjacent fingers and surrounding said opening in the finger-extended positions, said tips being radiussed.

6. Apparatus according to claim 1 wherein said fingers are elongated and have a passage therethrough for flow of a gas under pressure from within the housing, through the finger passages and onto the work surface.

7. Apparatus according to claim 1 wherein said fingers are carried on a spherical bearing carried by said housing.

8. Apparatus according to claim 1 wherein the tips of said fingers carry a roller to enable a rolling movement of said housing along the work surface when the fingers engage the work surface.

9. Apparatus according to claim 1 wherein the tips of said fingers carry a ball having a coefficient of friction reduced relative to the coefficient of friction of material forming said fingers.

10. Apparatus according to claim 1 including means for oscillating said fingers at a frequency and amplitude sufficient to facilitate travel of the fingertips along the work surface upon movement of the housing relative to the work surface.

11. Apparatus according to claim 1 including a second array of discrete fingers carried by said housing for movement substantially independently of one another and the first-mentioned array of fingers between retracted positions and positions extending from said housing surrounding said opening.

12. Apparatus according to claim 1 wherein adjacent fingers have cooperable detents to limit the extent of travel of one finger relative to an adjacent finger.

13. Apparatus according to claim 12 wherein said cooperable detents include a projection carried by said one finger and a stop carried by said adjacent finger, said projection and said stop being engageable with one another at the limit of travel of said one finger relative to said adjacent finger.

14. Apparatus according to claim 1 including a flexible seal carried by said fingers adjacent said tips thereof for engaging the work surface forming a seal compliant with the work surface.

15. Apparatus according to claim 14 wherein said seal is formed of a porous material.

16. Apparatus according to claim 14 wherein said seal is formed of a non-porous material.

17. Apparatus according to claim 1 including a flexible membrane extending from said housing surrounding said fingers in said extended positions thereof.

18. Apparatus according to claim 17 wherein said flexible membrane includes a flexible seal mounted on a distal end thereof for forming a compliant seal with the work surface.

19. Apparatus according to claim 1 wherein said fingers have axes and extend along said axes between said retracted and said extended positions, a pre-shaped flexible skirt extending from said housing surrounding said fingers in said extended positions thereof, said skirt being pre-shaped according to predetermined contours of the work surface and having angularly related sealing edges for sealing with the predetermined contours of the work surface, said edges extending at angles non-perpendicular to the axes of said fingers.

20. Apparatus according to claim 1 including a plurality of tubes about said housing and concentrically receiving said fingers, said fingers being slidable within said tubes within said extended positions and said retracted positions.

21. In an apparatus for processing a submerged work surface having a closed housing, an opening, a working head within said housing and an array of discrete fingers carried for movement substantially independently of one another between retracted positions and positions extending from said housing surrounding said opening, a method for excluding fluid from the work surface, comprising the steps of:
    extending the fingers substantially independently of one another relative to the housing enabling tips of the fingers to engage or lie in close proximity to the submerged surface in said extended positions of said fingers;
    advancing the housing along the work surface with the fingers following the contour of the work surface and movable independently of one another to substantially exclude fluid from the work surface exposed to the working head within the housing; and
    operating the working head to process said work surface through said opening as the housing is advanced along the work surface.

22. A method according to claim 21 including supplying a gas within said housing in communication with portions of said fingers for extending the fingers from the housing.

23. A method according to claim 21 including biasing said fingers for movement into said extended positions thereof.

24. A method according to claim 21 wherein said fingers are elongated and have a passage therethrough and including flowing a gas under pressure from within the housing through the finger passages and onto the work surface.

25. A method according to claim 21 wherein said fingers are carried on a spherical bearing carried by said housing and including the step of displacing said fingers relative to said housing and to one another as said housing is advanced along the work surface.

26. A method according to claim 21 wherein the tips of said fingers carry a roller, and including the step of rolling said housing along the work surface when the fingers engage the work surface.

27. A method according to claim 21 including oscillating said fingers at a frequency and amplitude sufficient to facilitate travel of the fingertips along the work surface as the housing is advanced along the work surface.

28. A method according to claim 21 including providing a second array of discrete fingers carried by said housing for movement substantially independently of one another and the first-mentioned array of fingers between retracted positions and positions extending from said housing surrounding said opening, and including the step of extending the fingers of the second array thereof to engage or lie in close proximity to the work surface as the housing is advanced therealong.

29. A method according to claim 21 including the step of limiting the extent of travel of one finger relative to an adjacent finger.

30. A method according to claim 21 including providing a flexible seal carried by said fingers adjacent said tips thereof for engaging the work surface, forming a seal compliant with the work surface.

31. A method according to claim 21 including providing a flexible membrane extending from said housing surrounding said fingers in said extended positions thereof.

* * * * *

UNITED STATES PATENT AND TRADEMARK OFFICE
CERTIFICATE OF CORRECTION

PATENT NO.   : 6,255,616 B1
DATED        : July 3, 2001
INVENTOR(S)  : Henry P. Offer It is certified that error appears in the above-identified patent and that said Letters Patent is hereby corrected as shown below:

<u>Column 9,</u>
Line 60, delete "he" and insert -- have --.

<u>Column 10,</u>
Line 4, delete "angles a" and insert -- angles α --.

Signed and Sealed this

Twenty-third Day of April, 2002

Attest:

JAMES E. ROGAN
*Attesting Officer*       *Director of the United States Patent and Trademark Office*